(12) United States Patent
Sarkar et al.

(10) Patent No.: US 12,549,124 B2
(45) Date of Patent: Feb. 10, 2026

(54) ENERGY HARVESTING VEHICLE (71) Applicant: TVS MOTOR COMPANY LIMITED, Chennai (IN)

(72) Inventors: Moumita Sarkar, Chennai (IN); N. Pramila Rao, Chennai (IN); Samraj Jabez Dhinagar, Chennai (IN)

(73) Assignee: TVS Motor Company Limited, Chennai (IN)

( * ) Notice: Subject to any disclaimer, the term of this patent is extended or adjusted under 35 U.S.C. 154(b) by 664 days.

(21) Appl. No.: 18/010,947

(22) PCT Filed: Oct. 3, 2020

(86) PCT No.: PCT/IN2020/050851
§ 371 (c)(1),
(2) Date: Dec. 16, 2022

(87) PCT Pub. No.: WO2022/003707
PCT Pub. Date: Jan. 6, 2022

(65) Prior Publication Data
US 2023/0223889 A1 Jul. 13, 2023

(30) Foreign Application Priority Data
Jun. 28, 2020 (IN) .............................. 202041027422

(51) Int. Cl.
*H02S 20/30* (2014.01)
*H02S 10/40* (2014.01)
(Continued)

(52) U.S. Cl.
CPC .............. *H02S 20/30* (2014.12); *H02S 10/40* (2014.12); *H02S 40/36* (2014.12);
(Continued)

(58) Field of Classification Search
CPC .......... H02S 20/30; H02S 10/40; H02S 40/36; B60K 2016/003; B60R 16/03; B60L 8/003
See application file for complete search history.

(56) References Cited

U.S. PATENT DOCUMENTS

2012/0133322 A1   5/2012  Walsh et al.
2014/0297072 A1  10/2014  Freeman
(Continued)

FOREIGN PATENT DOCUMENTS

DE           19907332 C1    4/2000

OTHER PUBLICATIONS

Egiziano L et al: "Experimental characterization of the photovoltaic generator for a hybrid solar vehicle", Industrial Electronics, 2007. ISIE 2007. IEEE International Symposium on, IEEE, PI, Jun. 1, 2007 (Jun. 1, 2007), pp. 329-334, XP031156157, ISBN: 978-1-4244-0754-5 p. 330; figure 2 (6 pages).
(Continued)

*Primary Examiner* — Timothy Hannon
(74) *Attorney, Agent, or Firm* — Osha Bergman Watanabe & Burton LLP (57) ABSTRACT

An energy harvesting vehicle includes a plurality of vehicular panels, and an energy canopy. The energy canopy is connected to at least two of the plurality of vehicular panels configured for generating electrical energy. The energy canopy includes a predetermined number of surfaces configured for receiving incident light, the incident light being received for a plurality of time durations. At least one of the predetermined number of surfaces includes a solar unit configured for harvesting the incident light. A predetermined number of solar units are positioned on a portion of the predetermined number of surfaces. The predetermined number of surfaces are connected in one of a series connection
(Continued)

and a parallel connection with each other. The one of the series connection and the parallel connection between the predetermined number of surfaces are configured for improving an energy conversion efficiency of the energy canopy, through enhanced harvesting of the incident light.

27 Claims, 8 Drawing Sheets

(51) Int. Cl.
  *H02S 40/36* (2014.01)
  *B60K 16/00* (2020.01)
  *B60R 16/03* (2006.01)

(52) U.S. Cl.
  CPC ......... *B60K 2016/003* (2013.01); *B60R 16/03* (2013.01); *B60Y 2400/216* (2013.01)

(56) References Cited

U.S. PATENT DOCUMENTS

2016/0126385 A1  5/2016  Kim et al.
2018/0072164 A1* 3/2018  Plesniak ................. B60L 53/00

OTHER PUBLICATIONS

Tomita Yosuke et al: "Stable Operation of an Automotive Photovoltaic System under Moving Shadows", 2019 8th International Conference on Renewable Energy Research and Applications (ICRERA). IEEE, Nov. 3, 2019 (Nov. 3, 2019), pp. 527-533, XP033716259, DOI: 10.1109/ICRERA47325.2019.8996949 [retrieved on Feb. 12, 2020] p. 527-p. 529; figures 1,4,5 (7 pages).
International Search Report issued in corresponding International Application No. PCT/IN2020/050851 mailed Mar. 19, 2021 (4 pages).
Written Opinion issued in corresponding International Application No. PCT/IN2020/050851 mailed Mar. 19, 2021 (7 pages).

* cited by examiner

ENERGY HARVESTING VEHICLE

TECHNICAL FIELD

The present subject matter relates to photovoltaic devices. More particularly, an energy harvesting vehicle with an energy harvesting structure for on-board energy generation is disclosed.

BACKGROUND

Photovoltaic devices, such as, solar panels are implementable solutions to address the energy crisis that the world is likely to face in current times as well as in the future. Solar panels are employed as energy sources in numerous commercial and domestic applications, such as vehicles, cooking, heating, etc. Solar panels on vehicle have not been commercially used much in the past because of low efficiency and its rigidity. But lately, the efficiency has increased and the solar panels now can be semi-flexible, without losing on efficiency. This makes them very suitable for on board energy generation. The solar harvesters are typically mounted on a roof, doors, a canopy, body panels, etc., of vehicles.

The solar harvesters when placed on a canopy or a roof of a vehicle can have a large area available for generating energy under sunlight. However, apart from the heavy vehicles with a large flat area on its roof, like a bus/truck/train, small vehicles, such as, four wheelers, three wheelers, or two wheelers do not have enough flat area on their roof. Consequently, the solar panel will be mounted on non-flat surfaces as well, to fulfill the energy requirement of the vehicle. For example, in a car, multiple areas like the roof, front/rear bonnet, doors etc., can be used for mounting solar panels, whereas in case of a scooter, a canopy over the vehicle will most likely be used for mounting the solar harvester. Hence, the solar module placed on it will be subjected to different levels of illumination depending on the shape and orientation of the canopy/roof, with respect to the position of sun. The solar panels may be subjected to partial shade or partial dust accumulation.

BRIEF DESCRIPTION OF DRAWINGS

The detailed description is described with reference to the accompanying figures. The same numbers are used throughout the drawings to reference like features and components.

DETAILED DESCRIPTION OF THE INVENTION

A solar panel has strings of solar cells connected in series. However, this configuration of cells in strings is done in a general manner at the manufacturer's end, without taking into consideration the shape and orientation of the roof/canopy on which it shall be mounted. When such a solar panel with solar cells connected in series is subjected to different levels of illumination/dust accumulation, it causes major power loss. Due to this, the functioning of the solar panel is adversely affected and there is a need for a customized solar module design as well as connection to reduce power losses arising out of uneven illumination on different parts of the solar module mounted on a vehicle. When a section of the solar panel is shaded, the generated electrical current from the solar cells in that section decreases proportionally with the illumination level. Due to the series connection, the solar cells with the lowest current determines the overall current in the solar panel. When only one solar cell out of the solar panel is shaded, this would lead to a complete loss of power of the whole solar panel and the efficiency of the solar panel drops.

In existing large-scale photovoltaic manufacturing units, required steps are taken to reduce partial shading losses at the solar panel level by various measures like different stringing arrangements of the solar cells, bypass diodes, power electronics etc. But when a solar panel is installed on a vehicle roof, the single solar panel might be subjected to partial shading or partial dust accumulation depending upon the shape of the vehicle roof or canopy. So, there is a need for configurational change to be made at the solar cell level to mitigate losses from partial shading and dust accumulation.

Further, when the vehicle is parked, and the solar panels are actively generating energy, there will be an optimum direction in which the vehicle can be parked to maximize the energy output. This optimum direction will depend upon the electrical connection between the solar cells in the solar panel, the direction of the magnetic poles of Earth, and also on the position of the sun in the sky or position of any artificial light source, such as, a street lamp. Most large-scale solar panels use trackers to move the solar panels so as to always face light source e.g. Sun. Such trackers are mostly mechanical systems that move the solar panel in a single or multiple axes. However, such an arrangement may not be feasible on a vehicle, being costly, heavy, and space occupying. Thus, there is a need for a method to intimate a user of the vehicle, the optimum direction of parking the vehicle to maximize the energy output, so that he/she can adjust the parking direction based on this input.

Therefore, there exists a need for a cell level customization for mitigating partial shading and partial dust accumulation losses on an energy harvesting vehicle mounted solar panel based on the structure and orientation of the surface on which they are mounted. Additionally, there is a need for a method to assist the user of the energy harvesting vehicle to park the energy harvesting vehicle in a way that the solar harvesters function efficiently overcoming all problems disclosed above as well as other problems of known art.

An energy harvesting vehicle comprising an energy harvesting structure, such as, an energy canopy is disclosed. The energy harvesting vehicle comprises a plurality of vehicular panels and the energy canopy is connected to at least two of the plurality of vehicular panels for generating electrical energy. The energy canopy comprises a predetermined number of surfaces receiving incident light for a plurality of time durations. At least one of the predetermined number of surfaces comprises a solar unit for harvesting the incident light. Also, a predetermined number of solar units positioned on a region of the predetermined number of surfaces are connected in a series connection or a parallel connection with each other, improving an energy conversion efficiency of the energy canopy, through an enhanced harvesting of the incident light.

The solar unit in each of the predetermined number of surfaces comprises one or more solar arrays. Each solar array comprises a plurality of solar cells electrically connected in series. One or more solar arrays in a solar unit are electrically connected in series with each other. Each of the predetermined number of surfaces has a different radius of curvature. The solar unit covers either complete area or partial area of each of the predetermined number of surfaces of the energy canopy. The predetermined number of surfaces for positioning the predetermined number of solar units is selected based on an angle of incidence of the incident light, radii of curvature of each of the predetermined number of surfaces, a parking location, a shading condition, and a dust condition. The energy canopy further comprises a bypass unit for bypassing each solar unit of the predetermined number of surfaces, based on one or more of the incident light intensity on each surface, almanac information, weather data, dust accumulation on the surface, and curvature of the surface.

The energy harvesting vehicle further comprises at least one first sensor for determining an instantaneous orientation of the energy harvesting vehicle with respect to magnetic poles. The energy harvesting vehicle further comprises at least one second sensor for identifying the surfaces of the energy canopy with the solar unit installed. In an embodiment, at least one second sensor identifies the surfaces of the energy canopy with dust accumulation.

The energy harvesting vehicle further comprises a parking controller for determining and recommending an optimal orientation of the energy harvesting vehicle in a parking location, based on a shading condition of each of the predetermined number of solar units. The energy harvesting vehicle further comprises at least one of a display interface and audio interface for notifying a user the optimal orientation for parking the vehicle which is intimated by a parking controller.

In another embodiment, the energy harvesting structure for generating electrical energy is disclosed. The energy harvesting structure comprises a predetermined number of surfaces receiving incident light for a plurality of time durations, a solar unit positioned on a region of at least one of predetermined number of surfaces for harvesting the incident light, and a plurality of wiring elements for electrically connecting a predetermined number of solar units on the predetermined number of surfaces in a series connection or a parallel connection with each other, for improving an energy conversion efficiency of the energy harvesting structure, through an enhanced harvesting of the incident light. At least of the predetermined number of surfaces has a different radius of curvature to form the energy harvesting structure.

The energy harvesting structure further comprises a bypass unit for bypassing each solar unit of the predetermined number of surfaces, based on one or more of the incident light intensity on each surface, almanac data, weather data, dust accumulation on the surface, and curvature of the surface. The solar unit in at least one of the predetermined number of surfaces comprises one or more solar arrays. Each solar array comprises a plurality of solar cells electrically connected in series. One or more solar arrays in a solar unit are electrically connected in series with each other.

In another embodiment, a method for determining an optimal orientation of parking an energy harvesting vehicle with the energy harvesting structure, at a parking location is disclosed. The method comprises steps of: determining an instantaneous orientation of the energy harvesting vehicle with respect to magnetic poles by at least one first sensor of the energy harvesting vehicle and identifying the surfaces of the energy harvesting structure with the solar unit by at least one second sensor of the energy harvesting vehicle. The first sensor is one of a magnetic compass, a hall sensor, an accelerometer, a sun sensor, a position sensor, a location sensor, and any combination thereof. The second sensor is one of a curvature sensor, a load sensor, a pressure sensor, and any combination thereof. Further, the method comprises analyzing the instantaneous orientation of the energy harvesting vehicle with respect to the magnetic poles and the identified surfaces with the solar units and determining an optimal orientation with minimal number of surfaces in shading at the parking location by a parking controller of the energy harvesting vehicle. The method further comprises the step of receiving almanac information on a current day by the parking controller for analyzing the current orientation of the energy harvesting vehicle with respect to the magnetic poles.

Additionally, the method comprises the steps of comparing the instantaneous orientation and the determined optimal orientation by the parking controller with a predetermined threshold and notifying a user of the energy harvesting vehicle to park the energy harvesting vehicle in the determined optimal orientation as intimated by the parking controller. The parking controller notifies the user of the energy harvesting vehicle on one of a display interface and audio interface of one of the energy harvesting vehicle and a user device possessed by the user.

At least one second sensor identifies the surfaces of the energy harvesting structure with dust accumulation. The method comprises a step of notifying the user to clean the identified surfaces with dust accumulation for better efficiency of the energy harvesting structure, by the parking controller. In an embodiment, the method further comprises generating periodic alerts by the parking controller about frequent adjusting of orientation of the energy harvesting vehicle to get a desired state of charge of an energy storage module charged using the energy harvesting structure.

The method further comprises a step of computing a state of charge of an energy storage module and a range of the energy harvesting vehicle by the parking controller, based on sensor data of at least one first sensor and at least one second sensor and a user input about an estimated time interval for which the energy harvesting vehicle will be parked in the instantaneous orientation during a given trip. The method further comprises computing and notifying, by the parking controller, the user about the time required to completely charge the energy storage module using the energy harvesting structure for a desired range of the energy harvesting vehicle. The method further comprises alerting the user about an insufficient charge of the energy storage module by the parking controller, to prevent the user from getting stranded.

Figure 1:
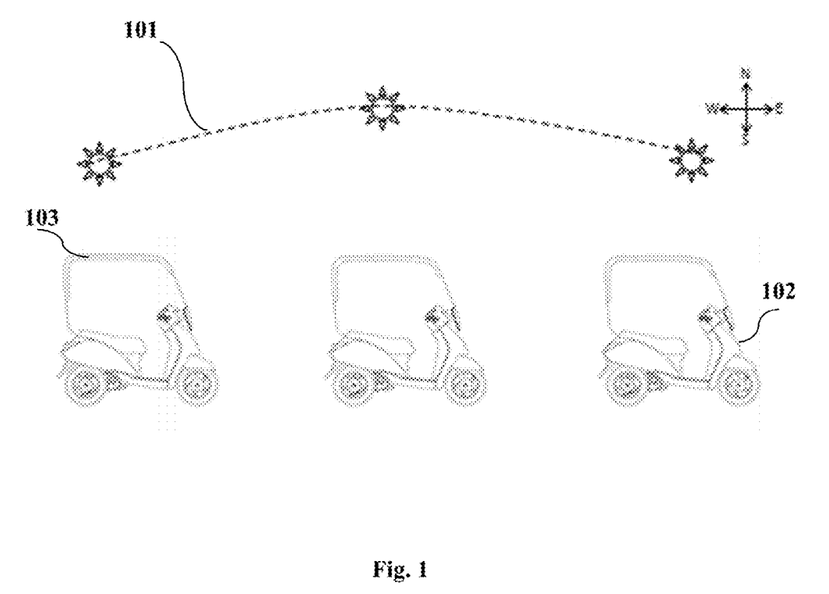
FIG. 1 exemplarily illustrates a schematic diagram of an energy harvesting vehicle with an energy canopy.

FIG. 1 exemplarily illustrates a schematic diagram of an energy harvesting vehicle 102 with an energy canopy 103. As used herein, the "energy harvesting vehicle" refers to a vehicle capable of generating electricity utilizing photovoltaic devices. The photovoltaic devices convert the incident light into electricity using the photovoltaic effect. The incident light may be from Sun, that is, the solar radiation, the light from a light source, such as, a street lamp, etc. The photovoltaic devices are the solar cells. Thus, the energy harvesting vehicle 102 is not limited to a vehicle harvesting solar radiation, but may include any energy harvesting vehicle that harvests the incident light and converts to electricity. However, for the sake of explanation, in the FIGS. 1-8, the energy harvesting vehicle 102 is described to be harvesting solar radiation, with reference to the position of Sun during a day. In an embodiment, the energy harvesting vehicle 102 also works during night time also to leverage maximum energy generation from any incident light at night e.g. from street light, etc. The energy canopy 103 is the energy harvesting structure of the energy harvesting vehicle 102. The energy canopy 103 harvests the incident radiation from Sun and/or a street lamp during both day and night. The path of the sun 101 in a day over the energy canopy 103 is shown. The energy canopy 103 comprises multiple surfaces to mount solar units (not shown) as will be disclosed in detailed description of FIGS. 2-3. Each solar unit comprises a plurality of solar cells. The multiple solar cells (not shown) mounted on the energy canopy 103 harvest the incident solar radiation and generate electricity. The generated electricity is used to drive the vehicle, power auxiliaries, such as, head lamp, turn signal lamps, charge batteries, etc., in the energy harvesting vehicle 102. The energy harvesting vehicle 102 depicted here is a two-wheeled vehicle, but is not limited to the two-wheeled vehicle. The energy harvesting vehicle 102 may be a three-wheeled vehicle, a four-wheeled vehicle, a saddle type vehicle, a step-through vehicle, etc. The three-wheeled energy harvesting vehicle or the four wheeled energy harvesting vehicle may include an energy canopy 103 in addition to the roof of the energy harvesting vehicle 102. In an embodiment, the solar cells mounted on the energy canopy 103 may be mounted directly on the roof, doors, bonnet, side panels, rear panels of the three-wheeled or four-wheeled energy harvesting vehicle 102. In an embodiment, the energy harvesting vehicle 102 may be a vehicle driven by an internal combustion engine, where the energy canopy 103 is used to power the auxiliaries in the vehicle. In an embodiment, the energy harvesting vehicle 102 is an electric vehicle, a hybrid vehicle, or a plug-in hybrid vehicle where the energy canopy 103 is used to drive and/or power the auxiliaries in the vehicle.

As exemplarily illustrated, different sections of the energy canopy 103 experience varying amount of solar radiation, for different time durations in a day due to the movement of Sun from East to West through the day. The energy canopy 103 gets uneven amount of solar radiation along its length at any given time of the day. Due to shadows formed on the sections of the energy canopy 103 during the course of day, the solar cells in those sections may not generate the desired voltage output. Certain sections of the energy canopy 103 may also be subjected to dust accumulation after prolonged use in a day or when the energy harvesting vehicle with the energy canopy is in prolonged idle condition and may not generate the desired voltage output. In this manner, the maximum output voltage of the energy canopy 103 is reduced and the energy harvesting vehicle 102 may not function efficiently. To overcome this problem, the different sections of the energy canopy 103 are identified and the electrical connection between the solar cells in the different sections is altered to reduce the energy losses in the energy harvesting vehicle 102 as will be described in the detailed description of FIGS. 2-6.

Figure 2:
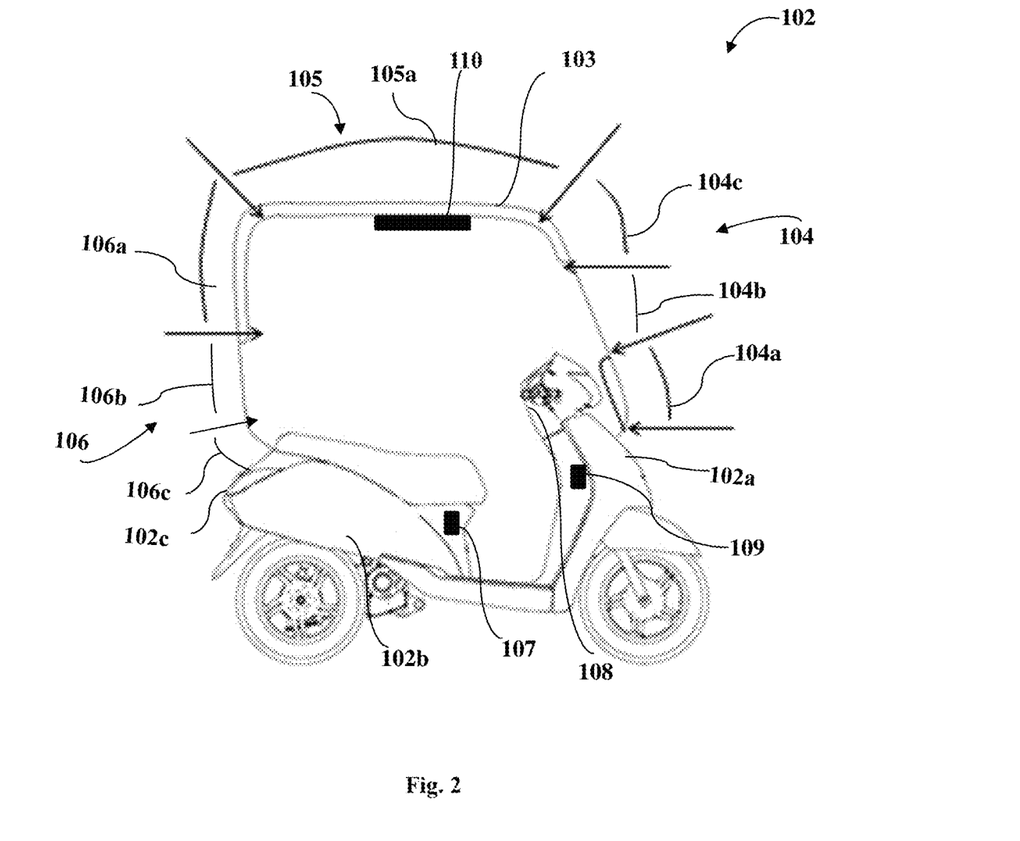
FIG. 2 exemplarily illustrates a perspective view of the energy harvesting vehicle comprising the energy canopy.

FIG. 2 exemplarily illustrates a perspective view of the energy harvesting vehicle 102 comprising the energy canopy 103. The energy harvesting vehicle 102 comprises multiple vehicular panels, such as, side panel 102b, rear panel 102c, front panel 102a, etc. The energy canopy 103 is connected to at least two vehicular panels. As exemplarily illustrated, the energy canopy 103 as per an embodiment is connected to the front panel 102a and the rear panel 102c of the energy harvesting vehicle 102. The energy canopy 103 is crown-shaped extending from the front panel 102a to the rear panel 102c, covering the length of the energy harvesting vehicle 102. The shape of the energy canopy 103 may be rectangular, arch shaped or semi-circular, squarical, etc. The energy canopy may be divided into multiple planar surfaces or arch shaped surfaces with different radii of curvature. In an embodiment, the curvature of the surfaces may match with the geometric form of the vehicular panels. The energy canopy 103 comprises a predetermined number of surfaces, out of the multiple planar or arch shaped surfaces, that receive incident solar radiations for different time durations. Out of all the surfaces of the energy canopy 103, only the predetermined number of surfaces receive incident solar radiation. Out of the predetermined surfaces, few surfaces will receive solar radiation through most part of the day, with minimal or no shading by Sun, accumulation of dust, etc. Such surfaces are identified to mount the solar units. Each solar unit comprises multiple cells that are connected in series. Here, in the crown shaped energy canopy 103, the number of arch shaped surfaces is identified as seven.

One or more surfaces form a section of the energy canopy 103 and the energy canopy 103 may have multiple such sections. As exemplarily illustrated, the three different sections of the energy canopy are a front section 104, a top section 105, and a rear section 106. During early hours of the day, when Sun is still low in the sky and is in East, in a condition where the front of the vehicle is facing east direction as shown in FIG. 1, only the front section 104 of the energy canopy 103 gets completely illuminated with substantially orthogonal incident solar light. Whereas, the top section 105 of the energy canopy 103 is partially or weakly illuminated and the rear section 106 of the energy canopy 103 is in complete shadow. Similarly, during mid-day, when the Sun is high up in the sky, the top section 105 of the energy canopy 103 is completely illuminated, whereas the front section 104 and the rear section 106 are partially or completely shaded. During late afternoon, when Sun is in West, the rear section 106 is completely illuminated whereas the top section 105 and the front section 104 are in partial or complete shade. The energy canopy 103 is divided into three sections 104, 105, and 106, and each of them has a different plane on which solar radiation is incident.

Also, due to the different radii of curvature of the energy canopy 103 in the front section 104, the front section 104 is divided into three surfaces 104a, 104b, 104c. Similarly, within the rear section 106, due to the different radii of curvature of the energy canopy 103, the rear section 106 is divided into three surfaces 106a, 106b, 106c. The top section 105 has only surface 105a. In the crown shaped energy canopy 103, the number of surfaces is seven.

Also, the predetermined number of surfaces with the incident solar radiation in each section of the energy canopy 103 is selected based on the angle of incidence of the incident light, a parking location, a shading condition, and a dust condition. In case, the energy harvesting vehicle 102 is parked in a parking location covering the rear section 106 and the top section 105 and only the front section 104 is exposed to the solar radiation, the surfaces 104a, 104b, 104c in the front section 104 are only identified for mounting the solar units, out of the seven surfaces. Similarly, if only the rear section 106 and front section 104 are cleaned, and the top section 105 has dust accumulation, the surfaces 104a, 104b, 104c, 106a, 106b, 106c in the front section 104 and the rear section 106 are only identified for mounting the solar units, out of the seven surfaces. However, the solar units may be mounted on at least one of the surfaces, such as, on 104a, 104b, 104c, 105a, 106a, 106b, and/or 106c.

For the sake of simplicity in explanation of FIGS. 3-6, the three surfaces 104a, 104b, 104c in the front section 104 of the energy canopy 103 are grouped and represented as a single surface 301 considering they are in substantially the same orientation of solar radiation incidence. For the same reason, the three surfaces 106a, 106b, 106c in the rear section 106 of the energy canopy 103 are grouped and represented as a single surface 303 considering they are substantially in the same orientation of solar radiation incidence. The surface 105a of the top section 105 is represented as 302. The three surfaces 301, 302, 303 are selected to install the solar units. At least one of these three surfaces 301, 302, and/or 303 has a solar unit installed. As exemplarily illustrated in FIG. 3, each of the surfaces 301, 302, 303 comprises a solar unit 304, 305, 306, respectively for harvesting the incident solar radiation as will be described in the detailed description of FIG. 3.

The energy harvesting vehicle 102 further comprises one or more first sensors 109 for determining an instantaneous orientation of the energy harvesting vehicle 102 with respect to magnetic poles. The first sensor 109 is one or more of a magnetic compass, a hall sensor, an accelerometer, a sun sensor, a position sensor, and/or a location sensor. The first sensors 109 determine magnetic poles, that is, North pole and South pole of Earth. With respect to the North pole and South pole, the first sensors 109 determine the current orientation of the energy harvesting vehicle 102, current location of the energy harvesting vehicle 102 as Global Positioning System (GPS) co-ordinates, etc.

The energy harvesting vehicle 102 further comprises one or more second sensors 110 for determining the surfaces of the energy canopy 103 with installation of the solar units. One or more of the identified surfaces 104a, 104b, 104c, 105a, 106a, 106b, 106c of the energy canopy 103 may have the solar units with the solar cells installed. The second sensors 110 are one or more of a curvature sensor, a load sensor, and/or a pressure sensor. The second sensors 110 may be installed on an inner surface of the energy canopy 103 to determine weight of the surface of the energy canopy 103. The second sensors 110 may be installed on the inner surfaces of the front section 104, the top section 105, and the rear section 106 to identify the surfaces of the energy canopy 103 with the solar units installed. The load sensor or the pressure sensor may measure weight of the surfaces 104a, 104b, 104c, 105a, 106a, 106b, 106c of the energy canopy 103 to determine the surfaces with the installation of the solar units. The load sensors may also determine the surfaces with the solar units with dust accumulation, based on an increase in weight of the surface from a prior known weight measurement. The curvature sensors may identify one or more surfaces 104a, 104b, 104c, 105a, 106a, 106b, 106c of the sections 104, 105, 106 based on the radii of the curvature, where there is a high probability to find a solar unit installed.

The energy harvesting vehicle 102 further comprises a parking controller 107 that determines and recommends an optimal orientation of the energy harvesting vehicle 102 in a parking location, based on a shading condition of the solar cells in the solar units installed on the surfaces 104a, 104b, 104c, 105a, 106a, 106b, 106c of the energy canopy 103. The parking controller 107 utilizes sensor data from the first sensors 109 and the second sensors 110 to determine the shading condition of the solar cells. The parking controller 107 may be part of a solar charger controller of the energy harvesting vehicle 102. The optimum direction in which the solar output of the energy canopy 103 is maximum is decided by the parking controller 107 based on the condition that the energy harvesting vehicle 102 should be parked such that maximum number of solar cells are completely illuminated by the solar radiation. This implies minimum number of solar cells are in partial shaded or completely shaded condition, at the given time of the day, when the energy harvesting vehicle 102 is parked at the parking location.

The energy harvesting vehicle 102 further comprises a user interface 108 that renders status information about the energy harvesting vehicle 102, the current orientation of the energy harvesting vehicle 102, the optimum orientation of the energy harvesting vehicle 102, user device notifications, navigational guidance, etc. The user interface 108 may be an audio and/or visual interface. The user interface 108 may be an instrument cluster of the energy harvesting vehicle 102. The parking controller 107 notifies the user of the energy harvesting vehicle 102 to park in the optimal orientation via the user interface 108 of the energy harvesting vehicle 102. In an embodiment, the parking controller 107 notifies the user of the energy harvesting vehicle 102 over a user interface of a user device possessed by the user.

Figure 3:
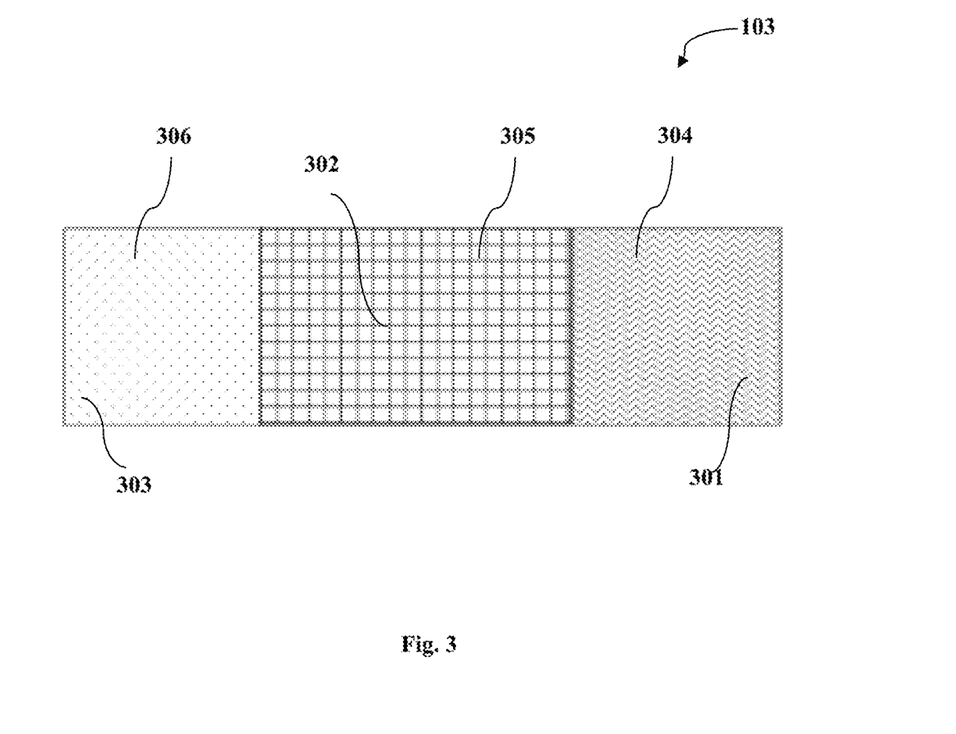
FIG. 3 exemplarily illustrates a plan view of the energy canopy with the identified surfaces.
Figure 4:
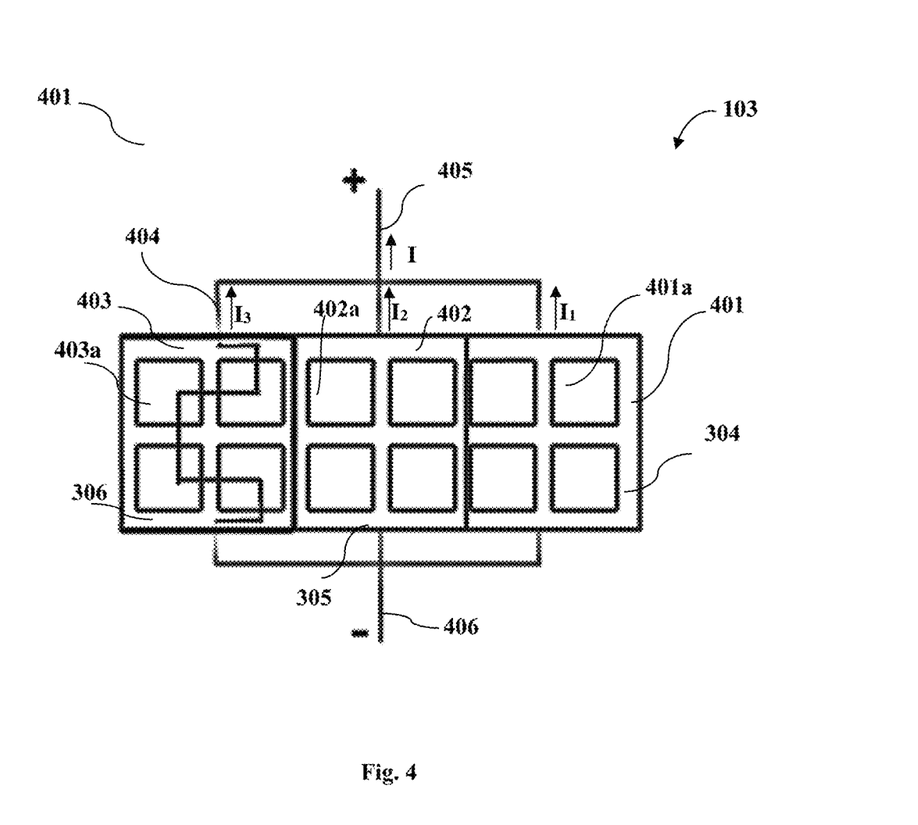
FIG. 4 exemplarily illustrates a schematic diagram showing electrical connections between the solar units of the energy canopy.

FIG. 3 exemplarily illustrates a plan view of the energy canopy 103 with the identified surfaces 301, 302, 303. The energy canopy 103 is divided into three surfaces 301, 302, and 303 that receive solar radiation in different planes. As exemplarily illustrated, each of the surfaces 301, 302, 303 comprises a solar unit 304, 305, and 306, respectively, for harvesting the incident solar radiation. In an embodiment, each of one or two of the surfaces 301, 302, or 303 has a solar unit such as, 304, 305, or 306. Each solar unit 304, 305, 306 comprises one or more solar arrays (not shown). Each solar array comprises multiple solar cells electrically connected in series as shown in FIG. 4. The solar arrays may be of same or variable lengths, based on the shape and orientation of the surface on which they are mounted. The solar arrays in the solar unit 304, 305, and 306 are electrically connected in series with each other as shown in FIG. 4. The incident energy harvested by the solar cells is used to charge an energy storage module, for example, a battery of the energy harvesting vehicle 102 using a solar charger controller. At any time of the day when one or more surfaces 301, 302, 303 of the energy canopy 103 are partially shaded, any one or more of the solar units 304, 305, 306 will be partially or completely shaded. To mitigate the solar output losses due to partial shading, the solar units 304, 305, 306 are connected to each other in series or parallel as will be disclosed in FIG. 4 and FIGS. 5A-5B.

FIG. 4 exemplarily illustrates a schematic diagram showing electrical connections between the solar units 304, 305, and 306 of the energy canopy 103. Each solar unit 304, 305, 306 comprises a solar array 401, 402, 403, respectively. The solar cells in each of the solar units 304, 305, 306 are connected in series using wiring elements, such as, 404 extending between the solar cells in a solar unit 304, 305, 306. Here, all the solar units 304, 305, 306 comprise only one solar array each, such as, 401, 402, 403 respectively. The solar array 401 of the solar unit 304 comprises solar cells, such as, 401a, 401b, 401c . . . (not shown) connected to each other in series using the wiring element 404.

Similarly, the solar array 402 of the solar unit 305 comprises solar cells, such as, 402a, 402b, 402c . . . (not shown) connected to each other in series using the wiring element 404. Similarly, the solar array 403 of the solar unit 306 comprises solar cells, such as, 403a, 403b, 403c . . . (not shown) connected to each other in series using the wiring element 404. The wiring element 404 from each solar array 401, 402, 403 extends from the two sides of the solar array 401, 402, 403 after connecting the solar cells, such as, 401a, 401b, 401c and 402a, 402b, 402c and 403a, 403b, 403c in the solar array 401, 402, 403 respectively, in series. These wiring elements 404 are connected together to connect the solar units 304, 305, 306 in parallel.

The solar units 304, 305, and 306 are connected to each other in parallel, as shown in FIG. 4. The parallelly connected solar units 304, 305, 306 form a positive terminal 405 and a negative terminal 406 of the energy canopy 103. The wiring elements 404 running along the length of a solar unit 304, 305, 306 connect to the positive terminal 405 and the negative terminal 406 at two ends. Based on incident radiation, the current $I_1$, $I_2$, $I_3$ generated in each of the solar units 304, 305, 306 is added up to give the total current I from the energy canopy 103 between the positive terminal 405 and the negative terminal 406.

Thus, when one of the solar units, for example, 306 is in partial or complete shade, the output current $I_3$ of that solar unit 306 is affected and although the total output current I of the energy canopy 103 is reduced, the losses are reduced compared to when all solar cells of all the solar units 304, 305, 306 in the energy canopy 103 are connected in series. The illuminated solar units 304, 305 or solar arrays 401, 402 continue to operate between a maximum power limit and their open-circuit voltage, whereas the shaded solar unit 306 or the solar array 403 does not generate any voltage or generates partial voltage. The length of the solar arrays 401, 402, 403 in the solar units 304, 305, 306 are so configured that they all have same substantially the same length, i.e., the solar arrays comprise same number of solar cells that are equally spaced using the same type of wiring element. The size of a few solar cells within a solar array or the size of the solar unit 304, 305, 306 itself may be calibrated to achieve substantially the same length of the solar arrays 401, 402, 403. In this case, the current output from each solar unit is same. When the lengths of the solar arrays 401, 402, 403 in the solar units 304, 305, 306 are not equal, the solar units 304, 305, 306 are connected to each other as shown in FIGS. 5A-5B.

Figure 5A:
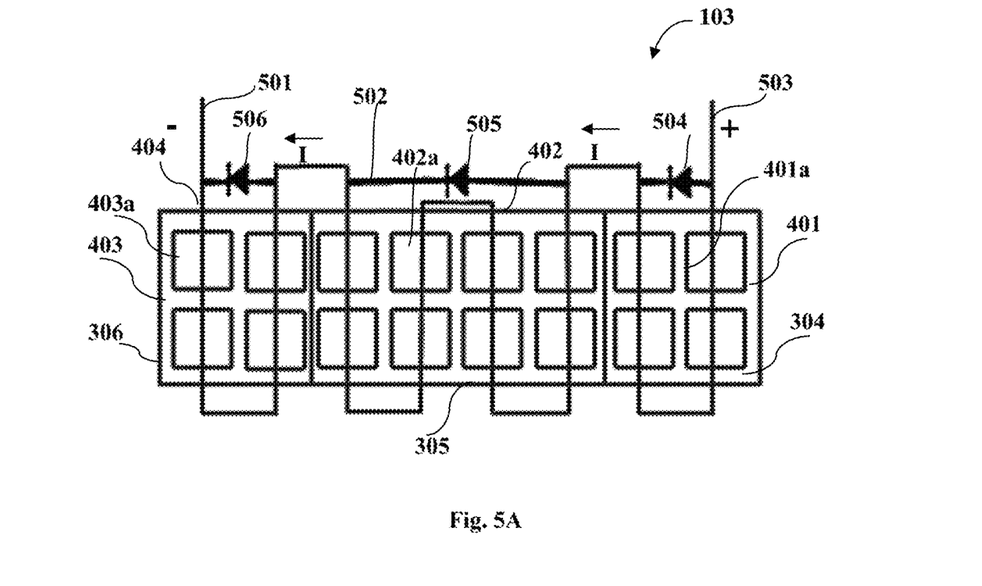
FIGS. 5A-5B exemplarily illustrate schematic diagrams of energy canopy showing electrical connections between the solar units of the energy canopy.
Figure 5B:
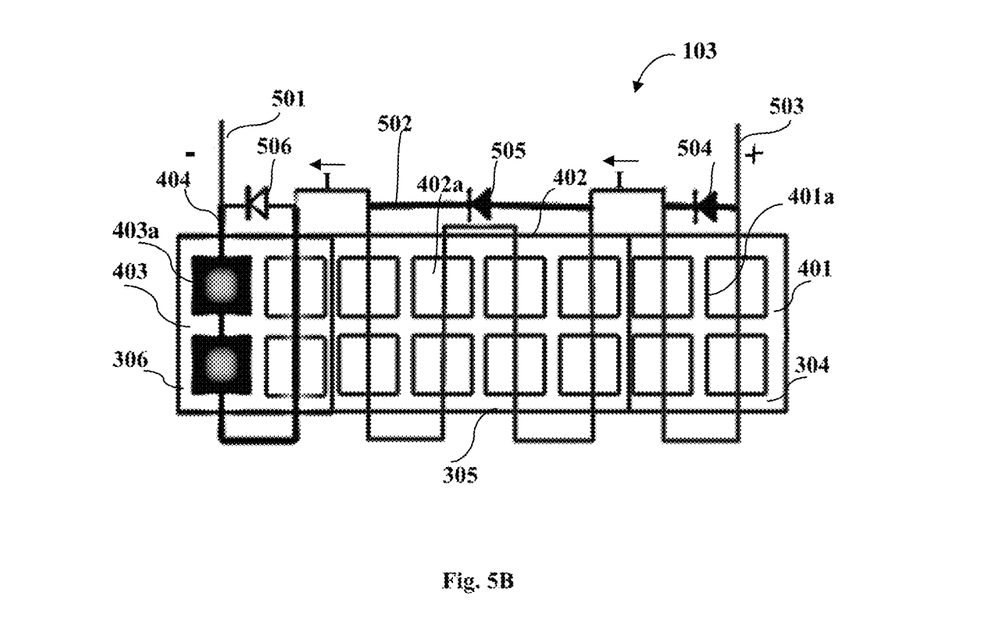

FIGS. 5A-5B exemplarily illustrate schematic diagrams of the energy canopy 103 showing electrical connections between the solar units 304, 305, 306 of the energy canopy 103. As exemplarily illustrated, a bypass unit 504, 505, 506 is electrically connected parallel to each solar unit 304, 305, 306 respectively. The bypass units 504, 505, 506 may be diodes, that conduct current when forward biased and block current when reverse biased. The solar units 304, 305, 306 are connected in series with each other. The solar cells in each of the solar units 304, 305, 306 are also connected in series. The wiring element 404 running through the solar array 401 connects the solar cells 402a in the solar array 402 and the solar cells 403a in the solar array 403 before terminating in a positive terminal 503 and a negative terminal 501.

The lengths of the solar arrays 401, 402, 403 in the solar units 304, 305, 306 respectively are not equal. The solar unit 305 has a greater number of solar cells, such as, 402a, 402b, 402c (not shown) that are connected to each other than the number of solar cells, such as, 401a, 401b (not shown) and 403a, 403b (not shown) in the solar units 304 and 306 respectively. The wiring elements, such as, 404 connecting the solar cells 401a, 401b, 401c (not shown), and 402a, 402b, 402c (not shown) and 403a, 403b, 403c (not shown) in the solar arrays 401, 402, 403 respectively connect the solar units 304, 305, 306 in series and form the positive terminal 503 and the negative terminal 501 for the energy canopy 103.

As exemplarily illustrated in FIG. 5B, the solar unit 306 may experience partial shading and not generate enough current. In such a case, the diode 506 across the solar unit 306 is forward biased and conducts to offer a path for the current I in the energy canopy to flow between the positive terminal 503 and the negative terminal 501. The solar units 304 and 305 continue to generate current I to a maximum limit since they are not subjected to partial shading or complete shading. The diodes 504 and 505 across the solar units 304 and 305 are reverse biased and the voltage generated from the solar units 304 and 305 is the voltage output of the energy canopy 103. The voltage generated by the solar units 304 and 305 reverse biases the diodes 504 and 505 respectively. The positioning of the diode 504, 505, 506 across each solar unit 304, 305, 306 ensures that there is minimal loss in voltage generated by non-functioning of one or more of the solar units, such as, 306 in the energy canopy 103.

Figure 6A:
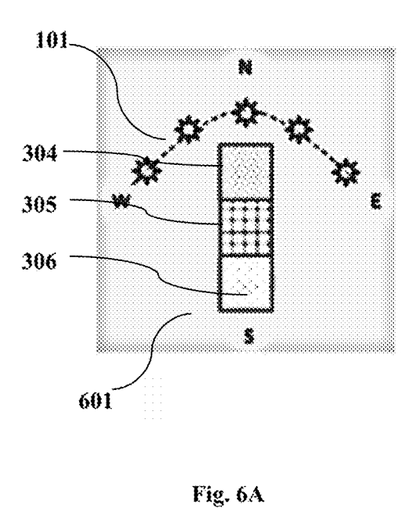
FIGS. 6A-6B exemplarily illustrates a schematic diagram showing parking of the energy harvesting vehicle with the energy canopy under Sun, during different times in a day for reducing loss of energy generated.
Figure 6B:
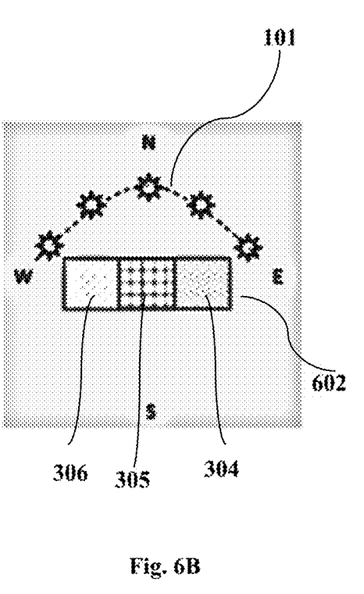

FIGS. 6A-6B exemplarily illustrates a schematic diagram showing parking of the energy harvesting vehicle 102 with the energy canopy 103 under Sun, during different times in a day for reducing loss of energy generated. As exemplarily illustrated, the energy harvesting vehicle 102 may be parked in two orientations shown in FIG. 6A and FIG. 6B, respectively. The trajectory of Sun 101 is also shown as it moves in the sky from East to West from early hours of morning to early hours of evening. At any given time in the day with the energy canopy 103 having electrical connections as disclosed in either FIG. 4 or FIGS. 5A-5B, there is always an optimal orientation in which the energy harvesting vehicle 102 can be parked to maximize the output of the energy canopy 103. As exemplarily illustrated in FIG. 6A, the energy harvesting vehicle 102 is parked in the orientation 601, and the energy canopy 103 is grouped into solar units 304, 305, 306 connected in series with the bypass units 504, 505, 506, based on the planes on which they have the solar radiation incident on them.

At a given time, for example morning when Sun is low in the sky in East, all the solar units 304, 305, 306 will be in partial shade and therefore all of them will incur losses from partial shade. Similarly, in the evening when Sun is low in the West, all the solar units 304, 305, 306 will be in partial shade. In an alternate possibility as exemplarily illustrated in FIG. 6B, the vehicle is parked in the orientation 602. When Sun is in East in the morning, only solar unit 306 will be in partial or complete shade, whereas the solar units 304 and 305 will receive substantially uniform sunlight. Similarly, in the evening when Sun is low in West, the solar unit 304 will be partial or complete shade whereas the solar units 305 and 306 will receive substantially uniform sunlight. In the midday, when Sun is high up in the sky, in both the orientations 601 and 602, both the solar units 304 and 306 will be in partial or complete shade and the solar unit 305 will receive uniform sunlight.

Therefore, in orientation 602, at any given time of the day, at least two solar units, 304 and 305 or 305 and 306 will receive uniform sunlight. In other words, at any given time, only one solar unit, either of 304 and 306, are in partial or complete shade. Hence, the losses from partial shading on the energy canopy 103 in orientation 602 is less compared to the possibility when the energy harvesting vehicle 102 is parked in the orientation 601 and at any given time of the day at least two solar units namely 304 and 306 are in partial or complete shade. Therefore, the orientation 602 is an optimal orientation in which when the energy harvesting vehicle 102 is parked, the energy canopy 103 will work at its highest efficiency.

Figure 7:
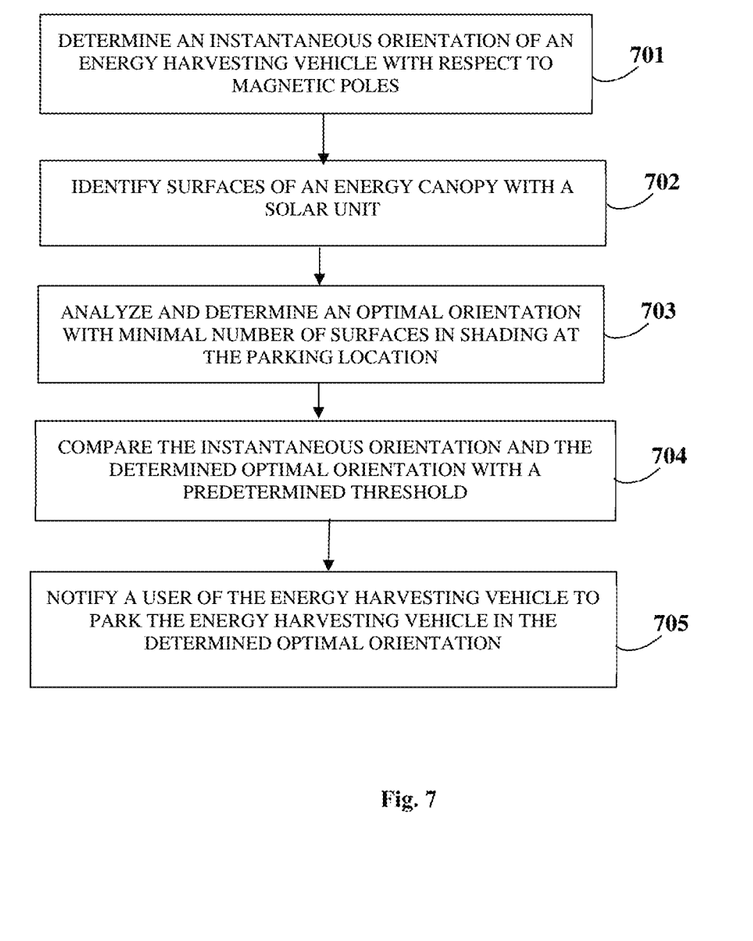
FIG. 7 exemplarily illustrates a flowchart showing a method for determining an optimal orientation of parking the energy harvesting vehicle at a parking location.

FIG. 7 exemplarily illustrates a flowchart showing a method for determining an optimal orientation of parking the energy harvesting vehicle 102 at a parking location. The energy harvesting vehicle 102 comprises an energy harvesting structure, such as an energy canopy 103 shown in FIG. 2. The energy harvesting structure 103 comprises a predetermined number of surfaces, such as, 3 surfaces namely, 301, 302, 303 receiving incident solar radiations for different time durations in a day. One or more solar units 304, 305, 306 for harvesting the incident solar radiation is positioned on at least one of the surfaces 301, 302, 303. Multiple wiring elements electrically connect the solar units 304, 305, 306 on the predetermined number of surfaces 301, 302, 303, in series or parallel with each other, for reducing loss in generating the electrical energy from the energy harvesting structure 103, based on the harvested incident solar radiation.

One or more first sensors 109 of the energy harvesting vehicle determine a current orientation of the energy harvesting vehicle 102 with respect to magnetic poles. One or more second sensors 110 of the energy harvesting vehicle 101 identifies the surfaces of the energy harvesting structure 103 with the solar unit 304, 305, and/or 306 installed. The second sensors 110, such as, load/pressure sensors may measure weight of the surfaces 301, 302, 303 of the energy canopy 103 to identify the surfaces with the installation of the solar units 304, 305, 306. The load sensors may also identify the surfaces with the solar units with dust accumulation, based on an increase in weight of the surface from a prior known weight measurement. The curvature sensors may identify one or more surfaces based on the radii of the curvature, where there is a high probability to have a solar unit is installed. In an embodiment, the surfaces with the solar units 304, 305, 306 installed is manually entered in the user interface by the user of the energy harvesting vehicle 102 and the second sensors 110 are by-passed.

The parking controller 107 of the energy harvesting vehicle 102 analyzes the data from the first sensors 109 and the second sensors 110 and determines an optimal orientation with minimal number of surfaces in shading at the parking location. In an embodiment, the surface The optimum direction in which the solar output of the solar units 304, 305, 306 maximizes is decided by the parking controller 107 based on the condition that the energy harvesting vehicle 102 should be parked such that maximum number of solar units 304, 305, and/or 306 are completely illuminated by the solar radiation, in other words, minimum number of solar units 304, 305, and/or 306 are going to be in partial shade or completely shaded condition, at the given time of the day.

To determine the optimal orientation of the energy harvesting vehicle 102, the parking controller 107 receives almanac information on a current day at the parking location of the energy harvesting vehicle 102. The almanac information comprises e.g. the rising and setting times of Sun on the current day, schedule of eclipses, weather forecast for the current day, date and time of the day, etc. The parking controller 107 compares the current orientation and the determined optimal orientation with a predetermined threshold. The parking controller 107 determines whether the angle between the current orientation and the optimal orientation is greater than the threshold value.

Further, the parking controller 107 notifies a user of the energy harvesting vehicle 102 to park the energy harvesting vehicle 102 in the determined optimal orientation, based on the comparison between the current orientation and the determined optimal orientation. The parking controller 107 notifies the user on a display interface and/or audio interface of the energy harvesting vehicle 102 and/or a user device possessed by the user. If the angle between the current orientation and the optimal orientation is greater than threshold value, the parking controller 107 notifies the user, else the parking controller 107 does not notify the user.

In an embodiment, the parking controller 107 may indicate to the user the identified surfaces with dust accumulation based on the sensor data from the second sensors. The parking controller 107 may suggest the user to clean such identified surfaces for better efficiency of the energy harvesting structure 103. If cleaning of the surfaces as indicated is done by the user immediately, the user may request the parking controller 107 to re-confirm and then park the energy harvesting vehicle 102 as per an indication from the parking controller 107. Else, the parking controller 107 may recommend the optimal orientation to park the energy harvesting vehicle 102, if the user is unable to clean the identified surfaces immediately or cleaning is not up to a desirable effectiveness.

Figure 8:
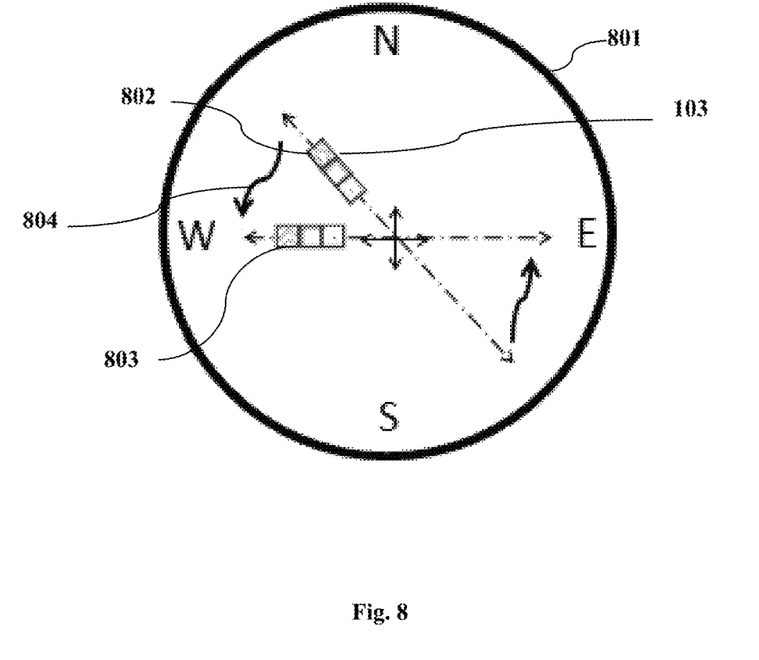
FIG. 8 exemplarily illustrates the visual display interface of the user device or the energy harvesting vehicle.

FIG. 8 exemplarily illustrates the visual display interface 801 of the user device or the energy harvesting vehicle 102. The visual display interface 801 is in the form of a circular dial as exemplarily illustrated in the current embodiment. The current orientation of the energy harvesting vehicle 102 is shown as an icon 802 in the display interface 801. The optimal orientation of the energy harvesting vehicle 102 is shown as an icon 803 in the display interface 801. The arrow mark 804 shows the direction in which the energy harvesting vehicle 102 should be moved to bring it to the desired optimal orientation and maximize the solar output. This visual display interface 801 can be displayed on the dashboard of the energy harvesting vehicle 102 and also alert the user on a user device of the energy harvesting vehicle 102, when the current orientation and the optimal orientation do not match and needs an adjustment.

An alert is displayed on the visual display interface 801 or rendered as an audio alert, if angle between the current orientation and the optimal orientation of the energy harvesting vehicle 102 is more than the predetermined threshold, for example, 15 degrees. In an embodiment, the dashboard may consist of a timer, based on which the parking controller 107 will be able to detect night time and be in sleep mode during night time. The parking controller 107 may be put offline manually by the user of the energy harvesting vehicle 102. The parking controller 107, the first sensors 109, and the second sensors 110 are powered by the solar units 304, 305, 306 and hence they will work even when the energy harvesting vehicle 102 is switched off. In an embodiment, the visual display interface 801 may display the approximate gain in solar output (power/current) when re-positioned in the suggested optimum orientation by the parking controller 107.

As an additional aspect, the user from the user device may enable receipt of periodic alerts from the parking controller 107 to decide about frequent adjusting of orientation of the energy harvesting vehicle 102 to get a desired state of charge. Alternatively, the parking controller 107 can compute based on sensor data of the first sensors 109 and the second sensors 110 and provide best possible state of charge (SOC) or range feasible based on user input about the estimated time interval for which the energy harvesting vehicle 102 will be parked on a given trip. If the SOC is not adequate as per user expectations, the parking controller 107 is configured to provide on-board diagnostic assistance to suggest means of maximizing SOC or alternatively suggest required time of external charging to achieve user desired range for next trip or a suggested route to get maximum effective charging. Also, the parking controller 107 as per an embodiment can be configured to alert in case of insufficient charge so as to avoid getting stranded e.g. alert of insufficient charge or insufficient opportunity of solar charging to get back home owing to weather conditions, etc.

The embodiment of the energy harvesting vehicle with the energy harvesting structure provide technical advancement in the field of photovoltaic technology as follows: The segregation of the solar cells into solar units and connecting the solar units in series or parallel based on configurations of the solar cells helps reduce losses in energy generated by the solar cells due to dust condition, shading condition, parking location, etc. The number of solar arrays in the solar units is based on the orientation and shape of the surfaces on which they are mounted on the energy harvesting vehicle body like roof, doors/side panels, front and back bonnet etc. The surfaces on which the solar units are mounted are differentiated based on the plane on which light is incident. The surfaces that have substantially the same plane of incident radiation receive similar levels of incident radiation, whereas the surfaces that have radiation incident on different planes, receive different levels of incident radiation at any given time of the day. In an embodiment, the solar units placed directly over the surfaces with substantially same plane of incident radiation may be connected in series. In an embodiment, when the solar units are connected to each other in parallel, the loss from partial shading or partial dust deposition is significantly less compared to the case when the solar cells are not grouped into solar arrays and solar units based on the plane of incident radiation or when all the solar cells are connected in series. Although there are losses, the energy from the un-shaded cells in the partially shaded solar unit is collected. In another embodiment, the solar units are connected in series and protected by bypass units. In this configuration, the bypass units allow the current from un-shaded solar units to flow around the partially or completely shaded solar units.

The different embodiments of the identification of the surfaces of the energy harvesting vehicle to mount the solar units and the electrical connection of the solar units facilitates mitigation of losses from partial shading of surfaces of the energy canopy, based on the shape and orientation of the surface. These embodiments are simple to install, do not involve extra cost and are effective in reducing the losses in the generation of energy to the extent possible by the energy canopy. Also, the parking controller as per the present subject matter enables optimizing the solar charging ability not only by reducing the losses from partial shading, but also communicates with the user of the energy harvesting vehicle ways and means to improve or maximize the efficiency of the energy harvesting vehicle by suggesting an optimal direction of parking the energy harvesting vehicle. The parking controller is autonomous and does not require manual intervention from the user about the surfaces with the solar units, the surroundings of the energy harvesting vehicle, etc. As per an aspect of the present invention, the energy harvesting structure herewith can also work at night time to leverage maximum energy generation from any incident light at night e.g. from street light, etc.

The energy harvesting structure generates electricity while the energy harvesting vehicle is in motion and also while the energy harvesting vehicle is in the parking location. Harvesting maximum incident solar radiation and light from artificial sources, such as, a street lamp, by reducing the losses due to shading and dust accumulation, during the energy harvesting vehicle is in motion is limited by the direction of travel of the energy harvesting vehicle and the transients in the motion of the energy harvesting vehicle due to the speed of the energy harvesting vehicle and the road condition. However, when the energy harvesting vehicle is in the parking location, the optimum direction of parking the energy harvesting vehicle is beneficiary to reap maximum benefits out of the available incident radiation. The energy harvesting vehicle intelligently determines the surfaces with the solar units installed and suggests an optimal orientation of the energy harvesting vehicle in a parking location via the user interface of the vehicle or the user device. In an embodiment, the parking controller may also suggest a suitable parking location to maximize the efficiency, if the parking controller is made aware of the surroundings and environmental factors of the energy harvesting vehicle. Also, the energy harvesting vehicle, when in motion, may be suggested with a best and optimal route to continue generating electricity, while keeping the travel time short and not cumbersome.

Improvements and modifications may be incorporated herein without deviating from the scope of the invention.

LIST OF REFERENCE NUMERALS

101—path of sun
102—energy harvesting vehicle
103—energy harvesting structure/energy canopy
104—front section
104a, 104b, 104c—surfaces of the front section
105—top section
105a—surface of top section
106—rear section
106a, 106b, 106c—surfaces of the rear section
107—parking controller
108—user interface
109—first sensors
110—second sensors
301, 302, 303—surfaces of energy canopy
304, 305, 306—solar units on the surfaces of energy canopy
401, 402, 403—solar arrays in solar units
401a, 402a, 403a—solar cells in solar arrays
404—wiring elements
405—positive terminal
406—negative terminal
501—negative terminal
502—wiring element
503—positive terminal
504, 505, 506—bypass units
601, 602—orientations
801—visual display interface
802—current orientation icon
803—optimal orientation icon
804—direction of rotation

We claim:

1. An energy harvesting vehicle comprising:
    a plurality of vehicular panels,
    an energy canopy, the energy canopy being connected to at least two of the plurality of vehicular panels configured for generating electrical energy,
    wherein the energy canopy comprises a predetermined number of surfaces configured for receiving incident light, the incident light being received for a plurality of time durations;
    wherein at least one of the predetermined number of surfaces comprises a solar unit configured for harvesting the incident light,
    wherein a predetermined number of solar units are positioned on a portion of the predetermined number of surfaces,
    wherein the predetermined number of surfaces are connected in one of a series connection and a parallel connection with each other,
    wherein the one of the series connection and the parallel connection between the predetermined number of surfaces are configured for improving an energy conversion efficiency of the energy canopy, through enhanced harvesting of the incident light,
    at least one first sensor configured for determining an instantaneous orientation of the energy harvesting vehicle with respect to magnetic poles, and
    at least one second sensor operatively connected to the solar unit and configured for identifying the predetermined number of surfaces of the energy canopy with the solar unit installed,
    wherein the at least one first sensor is one of a magnetic compass, a hall sensor, an accelerometer, a sun sensor, a position sensor, a location sensor, and a combination thereof,
    wherein the at least one second sensor is configured to identify the predetermined number of surfaces of the energy canopy having dust accumulation, and
    wherein the at least one second sensor comprises at least one of:
        a curvature sensor configured to identify one or more surfaces based on radii of curvature where solar units are installed, and
        one of a load sensor and a pressure sensor, configured to measure weight of the surfaces to determine installation of solar units and detect dust accumulation based on weight increase from a prior known weight measurement.

2. The energy harvesting vehicle as claimed in claim 1, wherein the solar unit in each of the predetermined number of surfaces comprises one or more solar arrays.

3. The energy harvesting vehicle as claimed in claim 2, wherein each solar array of the one or more solar arrays comprises a plurality of solar cells electrically connected in series.

4. The energy harvesting vehicle as claimed in claim 2, wherein the one or more solar arrays in the solar unit are electrically connected in series with each other.

5. The energy harvesting vehicle as claimed in claim 1, wherein the at least one of the predetermined number of surfaces having a different radius of curvature to form the energy canopy.

6. The energy harvesting vehicle as claimed in claim 1, wherein the predetermined number of surfaces is determined based on an angle of incidence of the incident light, radii of curvature of each of the predetermined number of surfaces, a shading condition, and a dust condition.

7. The energy harvesting vehicle as claimed in claim 1, wherein the energy canopy further comprises a bypass unit configured for bypassing each solar unit of the predetermined number of surfaces based on intensity of one or more of the incident light on each surface, an almanac information, a weather data, a dust accumulation on the surface, and a curvature of the surface.

8. The energy harvesting vehicle as claimed in claim 1, further comprises a parking controller configured for determining and recommending an optimal orientation of the energy harvesting vehicle in a parking location, the orientation being determined based on a shading condition of each of the predetermined number of solar units.

9. The energy harvesting vehicle as claimed in claim 8, further comprises at least one of a display interface and an audio interface configured to notify a user of the energy harvesting to park the energy harvesting vehicle in the optimal orientation.

10. An energy canopy for generating electrical energy, the energy canopy comprising:
    a predetermined number of surfaces configured for receiving incident light for a plurality of time durations,
    a solar unit positioned on a portion of at least one of the predetermined number of surfaces for harvesting the incident light,
    a plurality of wiring elements configured for electrically connecting the predetermined number of solar units on the predetermined number of surfaces in one of a series connection and a parallel connection with each other, for improving an energy conversion efficiency of the energy canopy, enabling an enhanced harvesting of the incident light,
    at least one first sensor configured for determining an instantaneous orientation of the energy harvesting vehicle with respect to magnetic poles, and
    at least one second sensor configured for identifying the predetermined number of surfaces of the energy canopy with the solar unit installed,
    wherein the solar unit in the at least one of the predetermined number of surfaces comprises one or more solar arrays,
    wherein each of the solar arrays comprises a plurality of solar cells electrically connected in a series,
    wherein the at least one first sensor is one of a magnetic compass, a hall sensor, an accelerometer, a sun sensor, a position sensor, a location sensor, and a combination thereof,
    wherein the at least one second sensor is configured to identify the predetermined number of surfaces of the energy canopy having dust accumulation, and
    wherein the at least one second sensor comprises at least one of:
        a curvature sensor configured to identify one or more surfaces based on radii of curvature where solar units are installed, and
        one of a load sensor and a pressure sensor, configured to measure weight of the surfaces to determine installation of solar units and detect dust accumulation based on weight increase from a prior known weight measurement.

11. The energy canopy as claimed in claim 10, wherein the solar unit in the at least one of the predetermined number of surfaces comprising one or more solar arrays.

12. The energy canopy as claimed in claim 11, wherein each solar array of the one or more solar arrays comprises a plurality of solar cells, the plurality of solar cells being electrically connected in a series connection.

13. The energy canopy as claimed in claim 12, wherein the one or more solar arrays in the solar unit are electrically connected in a series connection.

14. The energy canopy as claimed in claim 13, wherein at least one of the predetermined number of surfaces having a different radius of curvature to form the energy canopy.

15. The energy canopy as claimed in claim 10, wherein the predetermined number of surfaces for positioning the predetermined number of solar units are selected based on one or more of an angle of incidence of the incident light, radii of curvature of each of the predetermined number of surfaces, a shading condition, and a dust condition.

16. The energy canopy as claimed in claim 10, further comprising a bypass unit configured for bypassing each solar unit of the predetermined number of surfaces, the each solar unit of the predetermined number of surfaces being bypassed based on intensity of one or more of an incident light on the each surface, an almanac data, a weather data, dust accumulation on the surface, and a curvature of the surface.

17. A method for determining an optimal orientation of parking an energy harvesting vehicle with an energy canopy, at a parking location, the energy canopy comprising:
a predetermined number of surfaces, the predetermined number of surfaces receiving an incident light for a plurality of time durations,
a predetermined number of solar units positioned on at least one of the predetermined number of surfaces for harvesting the incident light,
a plurality of wiring elements configured for electrically connecting the predetermined number of solar units on the predetermined number of surfaces in one of a series connection and a parallel connection, for improving an energy conversion efficiency of the energy canopy, through an enhanced harvesting of the incident light,
at least one first sensor configured for determining an instantaneous orientation of the energy harvesting vehicle with respect to magnetic poles, and
at least one second sensor configured for identifying the predetermined number of surfaces of the energy canopy with the solar unit installed,
wherein the at least one first sensor is one of a magnetic compass, a hall sensor, an accelerometer, a sun sensor, a position sensor, a location sensor, and a combination thereof,
wherein the at least one second sensor is configured to identify the predetermined number of surfaces of the energy canopy having dust accumulation, and
wherein the at least one second sensor comprises at least one of:
a curvature sensor configured to identify one or more surfaces based on radii of curvature where solar units are installed, and
one of a load sensor and a pressure sensor, configured to measure weight of the surfaces to determine installation of solar units and detect dust accumulation based on weight increase from a prior known weight measurement,
the method comprising:
determining an instantaneous orientation of the energy harvesting vehicle with respect to magnetic poles by at least one first sensor of the energy harvesting vehicle;
identifying the surfaces of the energy canopy with the predetermined number of solar units, by at least one second sensor of the energy harvesting vehicle;
analysing an instantaneous orientation of the energy harvesting vehicle in comparison to the magnetic poles and the identified predetermined number of surfaces with the solar units, and determining an optimal orientation including the predetermined number of surfaces in a shading condition at a parking location by a parking controller of the energy harvesting vehicle;
comparing the instantaneous orientation and the determined optimal orientation with a predetermined threshold by the parking controller; and
notifying a user of the energy harvesting vehicle to park the energy harvesting vehicle in the determined optimal orientation by the parking controller.

18. The method as claimed in claim 17, wherein the at least one first sensor is one of a magnetic compass, a hall sensor, an accelerometer, a sun sensor, a position sensor, a location sensor, and a combination thereof.

19. The method as claimed in claim 17, wherein the at least one second sensor is one of a curvature sensor, a load sensor, a pressure sensor, and a combination thereof.

20. The method as claimed in claim 17, further comprising receiving almanac information on a current day by the parking controller for analysing the instantaneous orientation of the energy harvesting vehicle with respect to the magnetic poles.

21. The method as claimed in claim 17, wherein the parking controller is configured to notify the user of the energy harvesting vehicle on one of a display interface and an audio interface of one of the energy harvesting vehicle and a user device possessed by the user.

22. The method as claimed in claim 17, wherein the at least one second sensor is configured to identify the surfaces of the energy canopy with dust accumulation.

23. The method as claimed in claim 22, further comprising notifying the user to clean the identified surfaces with dust accumulation for better efficiency of the energy canopy, by the parking controller.

24. The method as claimed in claim 17, further comprising generating periodic alerts by the parking controller about frequent adjusting of orientation of the energy harvesting vehicle to get a desired state of charge of an energy storage module being charged using the energy canopy.

25. The method as claimed in claim 17, further comprising computing a state of charge of an energy storage module and a range of the energy harvesting vehicle by the parking controller, based on a sensor data of the at least one first sensor and the at least one second sensor and a user input about an estimated time interval for which the energy harvesting vehicle will be parked in the instantaneous orientation.

26. The method as claimed in claim 25, further comprising computing and notifying the user by the parking controller, about a time required to completely charge the energy storage module using the energy canopy for a desired range of the energy harvesting vehicle.

27. The method as claimed in claim 25, further comprising alerting the user about an insufficient charge of the energy storage module by the parking controller, to prevent the user from getting stranded.

\* \* \* \* \*